United States Patent Office 3,554,977
Patented Jan. 12, 1971

3,554,977
PROCESS OF PREPARING POLYESTERS FROM BIS-HYDROXYALKYL ESTERS OF AROMATIC DICARBOXYLIC ACIDS
Mary E. Carter, Philadelphia, Pa., assignor to FMC Corporation, Philadelphia, Pa., a corporation of Delaware
No Drawing. Filed Aug. 30, 1967, Ser. No. 664,262
Int. Cl. C08g 17/015
U.S. Cl. 260—75
13 Claims

ABSTRACT OF THE DISCLOSURE

A process of preparing polyester resins comprising polycondensing a bis-hydroxyalkyl ester of an aromatic dicarboxylic acid and an aromatic dicarboxylic acid in the presence of a catalyst selected from the group consisting of a suitable hexafluoroantimonate, hexafluoroarsenate, hexafluorotitanate, tetrafluoroantimonite, or tetrafluoroarsenite.

---

This invention relates to a method of preparing highly polymeric linear polyesters. More particularly, it relates to an improved method of preparing polyesters which have excellent physical and chemical properties so as to make them particularly suitable for use in preparing filaments and films.

In general, it is known that a polyethylene terephthalate resin suitable for use in the manufacture of films and filaments should have a carboxylic content value of about or below 50 equivalents per million grams (eq./$10^6$ gr. or meq./kg.) and an intrinsic viscosity preferably not less than about 0.60 (as determined in a 60% phenol and 40% tetrachloroethane solution, wt./wt., at 30° C.) in order for such products to possess a satisfactory level of heat and hydrolytic stability and a high degree of tenacity.

It is an object of this invention to prepare polyester resin by carrying out a polycondensation reaction between a bis-hydroxyalkyl ester of an aromatic dicarboxylic acid and an aromatic dicarboxylic acid.

Another object of the present invention is to provide an improved method for the preparation of highly polymeric linear polyethylene terephthalate by carrying out a reaction between a bis-hydroxyalkyl ester of an aromatic dicarboxylic acid and an aromatic dicarboxylic acid in the presence of a single catalyst.

These and other objects are accomplished in accordance with the present invention which involves a method of preparing polyester resins comprising carrying out a polycondensation reaction between a bis-hydroxyalkyl ester of an aromatic dicarboxylic acid and an aromatic dicarboxylic acid in the presence of a catalytic amount of a catalyst selected from the group having the formulas $MMeF_6$, $M'_xTiF_6$, and $M''Me''F_4$, wherein M represents a substituent selected from the group consisting of an alkali metal and an $NH_4$-group or a substituted $NH_4$-group wherein at least one hydrogen atom of which is substituted with a lower alkyl radical containing 1 to 6 carbon atoms, Me represents a substituent selected from the group consisting of antimony and arsenic, M' represents a substituent selected from the group consisting of an alkali metal, an alkaline earth metal and an $NH_4$-group, $x$ is 1 where M' is a bivalent metal and $x$ is 2 where M' is a monovalent metal or an $NH_4$-group, M'' represents a substituent selected from the group consisting of an alkali metal and an $NH_4$-group, Me'' represents a substituent selected from the group consisting of arsenic and antimony.

For purposes of simplicity, the term "bis-hydroxyalkyl ester" used hereinafter will denote bis-hydroxyalkyl esters of aromatic dicarboxylic acids.

The present invention can be carried out in either a batch process or in a continuous process. In the practice of the present invention, the ratio of the bis-hyroxyalkyl ester to the aromatic dicarboxylic acid used is in the range of from about 1.2:1 to about 4:1. However, in most instances, it has been found that the preferred ratio of bis-hydroxyalkyl ester to aromatic dicarboxylic acid is in the range of from about 1.5:1 to about 3:1, in view of ease of handling, speed of reaction and chemical and physical characteristics of polyester resin products produced.

The catalysts which are used to catalyze the reaction in the present method may be suitably varied within the above limitations to meet specific conditions or requirements desired. For example, among the catalyst that can be used in accordance with the present invention are ammonium hexafluoroantimonate, potassium hexafluoroantimonate, tripropyl ammonium hexafluoroarsenate, ammonium hexafluorotitanate, calcium hexafluorotitanate, potassium hexafluorotitanate, ammonium tetrafluoroantimonite, potassium tetrafluoroantimonite, potassium tetrafluoroarsenite or any combination thereof.

The present catalysts are generally employed in amounts ranging from $5 \times 10^{-6}$ to about $5 \times 10^{-2}$ mole per equivalent mole of dicarboxylic acid. The term "equivalent mole of dicarboxylic acid" as used herein, includes unreacted dicarboxylic acid contained in the inital reacton mixture plus reacted dicarboxylic acid contained in the bis-hydroxyalkyl ester present in the initial reaction mixture.

In general, the first stage of the present invention can be carried out at atmospheric pressure or under superatmospheric pressure within the range of from about 40 to 100 p.s.i., in the absence of an oxygen-containing gas, depending on the reaction rate desired. For example, nitrogen gas may be used for the oxygen-free atmosphere. When the first stage reaction is carried out at atmospheric pressure, it is generally conducted within the temperature range of from about 220°–260° C.; whereas when superatmospheric pressure is used, the first stage of the present reaction is carried out at a temperature within the range of about 220°–290° C. However, it has been found that the preferred temperature and pressure ranges under superatmospheric condititons are from about 250°–270° C. at from about 50–70 p.s.i., in view of the optimum rate of reaction achieved. When the reaction mixture appears as a clear melt, it is an indication that the first stage of the reaction is complete and a prepolymer has been formed. At this point, the superatmospheric pressure is released and the reaction mixture is further heated in the range of from about 220–290° C. at atmospheric pressure for about 15–30 minutes in the absence of an oxygen-containing gas to remove any by-product water and excess glycol which has formed and drive the reaction mixture to completion. Thereafter, the reaction mixture is further polycondensed at temperature ranges from about 260°–325° C. under reduced pressure of from about 0.05 to 20 mm. of mercury for 2 to 5 hours to form the desired polyester resin product.

The following examples of several preferred embodiments will further serve to illustrate the present invention. All parts are by weight, unless otherwise indicated.

EXAMPLE I

A mixture of 95 g. of bis-2-hydroxyethyl terephthalate, 31 g. of terephthalic acid and 0.0154 g. of potassium hexafluoroantimonate was charged to a Fischer-Porter pressure assembly equipped with a nitrogen sparge tube and distilling arm. The reaction vessel was lowered into an oil bath having a temperature of about 260° C. and flushed for ten minutes with dry nitrogen. A nitrogen pressure of about 60 p.s.i. was applied and a distillate of water-ethylene glycol was collected. When a clear reaction mixture, i.e. solution, was obtained (after about 3 hours), the pressure was reduced to atmospheric and the remaining excess water-glycol mixture was distilled. Then, the resulting low molecular weight prepolymer was further polycondensed under a vacuum of about 0.1 mm. of mercury at 280° C. for about 4 hours to form the desired resin. The resulting polyester product had an intrinsic viscosity of 0.67, and a carboxyl content value of 32 (meq./kg.).

EXAMPLE II

A mixture of 95. g. of bis-2-hydroxyethyl terephthalate, 21 g. of terephthalic acid and 0.0114 g. of calcium hexafluorotitanate was charged to a Fischer-Porter pressure assembly equipped with a nitrogen sparge tube and distilling arm. The reaction vessel was lowered into an oil bath having a temperature of about 260° C. and flushed for ten minutes with dry nitrogen. A nitrogen pressure of about 60 p.s.i. was applied and a distillate of water-ethylene glycol was collected. When a clear reaction mixture, i.e. solution, was obtained (after about 3 hours), the pressure was reduced to atmospheric and the remaining excess water-glycol mixture was distilled. Then, the resulting low molecular weight polyester was further reacted under a vacuum of about 0.1 mm. of mercury at 280° C. for about 4 hours to form the desired resin. The resulting polyester product had an intrinsic viscosity of 0.71, and a carboxyl content value of 39 (meq./kg.).

EXAMPLE III

A mixture of 95.25 g. of bis-2-hydroxyethyl terephthalate, 15.53 g. of terephthalic acid and 0.0050 g. of ammonium hexafluorotitanate was charged to a Fischer-Porter pressure assembly equipped with a nitrogen sparge tube and distilling arm. The reaction vessel was lowered into an oil bath having a temperature of about 260° C. and flushed for ten minutes with dry nitrogen. A nitrogen pressure of about 60 p.s.i. was applied and a distillate of water-ethylene glycol was collected. When a clear reaction mixture, i.e. solution, was obtained (after about 2 hours), the pressure was reduced to atmospheric and the remaining excess water-glycol mixture was distilled. Then, the resulting low molecular weight polyester was further reacted under a vacuum of about 0.1 mm. of mercury at 280° C. for about 4 hours to form the desired resin. The resulting polyester product had an intrinsic viscosity of 0.83, and a carboxyl content value of 34 (meq./kg.).

EXAMPLE IV

A mixture of about 31 g. of terephthalic acid, 95 g. of bis-2-hydroxyethyl terephthalate, and 0.0142 g. of ammonium hexafluoroantimonate, is charged to a Fischer-Porter pressure assembly equipped with a nitrogen sparge tube and a distilling arm. The reaction vessel is lowered into an oil bath at a temperature of 260° C. and flushed for ten minutes with dry nitrogen. A nitrogen pressure of about 60 p.s.i. is applied and a distillate of water-ethylene glycol is collected. When a clear reaction mixture is obtained (after about 3 hours), the pressure is reduced to atmospheric and the remaining excess water-glycol is distilled off. Then, the resulting polyester prepolymer is further reacted (polycondensed) under a vacuum of 0.1 mm. of mercury for about 4 hours at 280° C. to form a polyester resin. The polyester resin formed has an intrinsic viscosity in excess of 0.60 and a suitably low carboxyl content value, indicating that it is useful for filament- and film-forming purposes.

EXAMPLE V

A mixture of 31 g. of terephthalic acid, 95 g. of bis-2-hydroxyethyl terephthalate and 0.0184 g. of tripropyl ammonium hexafluoroarsenate is charged to a Fischer-Porter reaction vessel equipped with a nitrogen sparge tube and a distilling arm. The reaction vessel is lowered into an oil bath at a temperature of 260° C. and flushed for ten minutes with dry nitrogen. A nitrogen pressure of about 60 p.s.i. is applied and a distillate of water-ethylene glycol is collected. When a clear reaction mixture is obtained (after about 3 hours), the pressure is reduced to atmospheric and the remaining excess water-glycol is distilled off. Then, the resulting polyester prepolymer is further polycondensed under a vacuum of 0.1 mm. of mercury at 280° C. for about 4 hours to form a polyester resin. The polyester resin formed has a high intrinsic viscosity and low carboxyl content value, indicating that it is suitable for filament- and film-forming purposes.

EXAMPLE VI

A mixture of about 31 g. of terephthalic acid, 95 g. of bis-2-hydroxyethyl terephthalate and 0.0134 g. of potassium hexafluorotitanate is charged to a Fischer-Porter reaction vessel equipped with a nitrogen sparge tube and a distilling arm. The reaction vessel is lowered into an oil bath at a temperature of 260° C. and flushed for ten minutes with dry nitrogen. A nitrogen pressure of about 60 p.s.i. is applied and a distillate of water-ethylene glycol is collected. When a clear reaction mixture is obtained (after about 3 hours), the pressure is reduced to atmospheric and the remaining excess water-glycol is distilled off. Then, the resulting polyester prepolymer is further reacted under a vacuum of 0.1 mm. of mercury at 280° C. for about 4 hours to form the desired polyester resin. The polyester resin formed has an intrinsic viscosity in excess of 0.60 and a carboxyl content value of less than 50 meq./kg., indicating that it is suitable for commercial filament- and film-forming purposes.

EXAMPLE VII

A mixture of about 31 g. of terephthalic acid, 95 g. of bis-2-hydroxyethyl terephthalate and 0.0127 g. of potassium tetrafluoroarsenite is charged to a Fischer-Porter pressure assembly equipped with a nitrogen sparge tube and a distilling arm. The reaction vessel is lowered into an oil bath at a temperature of 260° C. and flushed for ten minutes with dry nitrogen. A nitrogen pressure of about 60 p.s.i. is applied and a distillate of water-ethylene glycol is collected. When a clear reaction mixture is obtained (after about 3 hours), the pressure is reduced to atmospheric and the remaining excess water-glycol is distilled off. Then, the resulting polyester prepolymer is further polycondensed under a vacuum of 0.1 mm. of mercury at 280° C. for about 4 hours to form a polyester resin. The polyester resin formed has an intrinsic viscosity in excess of 0.60 and a carboxyl content value of less than 50 meq./kg.

The intrinsic viscosities of the polyester resins produced for the above examples were measured in a 60% phenol and 40% tetrachloroethane solution, wt./wt. at 30° C. The other analytical values were obtained by conventional laboratory procedures.

The polyester resins produced by the present method were characterized by high molecular weights, as indicated by their intrinsic viscosities and low carboxyl contents. Thus, indicating that they are suitable for filament- and film-forming purposes.

While the present invention has been illustrated with particular reference to polyehtylene terephthalate, the present invention also includes within its scope the preparation of other similar polyesters formed from bis-hydroxyalkyl esters derived from any suitable aromatic dicarboxylic acid, such as isophthalic acid and 4,4'-diphenyldicarboxylic acid and wherein the alkyl component contains from 1 to 10 carbon atoms. The aromatic dicarboxylic acid component of the reaction mixture can also be suitably varied within such limits as set forth in relation to the acid precursor of the bis-hydroxyalkyl esters.

I claim:

1. In a process of preparing polyester resins wherein an initial reaction mixture consisting essentially of a bis-hydroxyalkyl ester of an aromatic dicarboxylic acid and an aromatic dicarboxylic acid at a ratio of from about 1.2:1 to about 4:1 respectively are reacted in a first stage to form a prepolymer and then the said prepolymer is polycondensed in a second stage to form said polyester resin, the improvement comprising catalyzing both of said stages with a catalytic amount of a catalyst consisting essentially of a compound having a formula selected from the group consisting of $MAsF_6$, $NH_4SbF_{,6}$, $M'_xTiF_6$ and $M''Me''F_4$, wherein M represents a substituent selected from the group consisting of an alkali metal, an $NH_4$-group and a substituted $NH_4$-group wherein at least one hydrogen atom of which is substituted with a lower alkyl radical containing from 1 to 6 carbon atoms, M' represents a substituent selected from the group consisting of an alkali metal, an alkaline earth metal and an $NH_4$-group, $x$ is 1 where M' is an alkaline earth metal and $x$ is 2 where M' is selected from the group consisting of an alkali metal and an $NH_4$-group, M'' represents a substituent selected from the group consisting of an alkali metal and an $NH_4$-group, Me'' represents a substituent selected from the group consisting of arsenic and antimony.

2. The method of claim 1 wherein the catalyst is present in an amount ranging from about $5 \times 10^{-6}$ to about $5 \times 10^{-2}$ mole per equivalent mole of dicarboxylic acid.

3. The method of claim 1 wherein the bis-hydroxyalkyl ester of an aromatic dicarboxylic acid is bis-2-hydroxyethyl terephthalate.

4. The process of claim 1 wherein the aromatic dicarboxylic acid is terephthalic acid.

5. The process of claim 1 wherein the catalyst is calcium hexafluorotitanate.

6. The process of claim 1 wherein the catalyst is ammonium hexafluorotitanate.

7. The process of claim 1 wherein the catalyst is tripropyl ammonium hexafluoroarsenate.

8. The process of claim 1 wherein the catalyst is potassium tetrafluoroarsenite.

9. The process of claim 1 wherein the catalyst is ammonium tetrafluoroantimonite.

10. The process of claim 1 wherein the catalyst is potassium hexafluorotitanate.

11. The process of claim 1 wherein the catalyst is potassium tetrafluoroantimonite.

12. The process of claim 4 wherein the catalyst is ammonium hexafluoroantimonate.

13. The process of claim 4 wherein the catalyst is ammonium hexafluorotitanate.

References Cited
UNITED STATES PATENTS

| | | | |
|---|---|---|---|
| 3,068,204 | 12/1962 | Perry et al. | 260—75 |
| 3,329,651 | 7/1967 | Dobinson | 260—75 |
| 3,359,241 | 12/1967 | Dobinson | 260—75 |

WILLIAM H. SHORT, Primary Examiner

L. P. QUAST, Assistant Examiner

U.S. Cl. X.R.
260—475

UNITED STATES PATENT OFFICE
CERTIFICATE OF CORRECTION

Patent No. 3,554,977    Dated January 12, 1971

Inventor(s) Mary E. Carter

It is certified that error appears in the above-identified patent and that said Letters Patent are hereby corrected as shown below:

> Col. 2, line 42, "condititons" should read
> --conditions--. Col. 3, line 10, "21 g."
> should read --31 g.--

Signed and sealed this 20th day of April 1971.

(SEAL)
Attest:

EDWARD M. FLETCHER, JR.
Attesting Officer

WILLIAM E. SCHUYLER, JR.
Commissioner of Patents